United States Patent [19]

Jump et al.

[11] Patent Number: 4,959,517

[45] Date of Patent: Sep. 25, 1990

[54] MICROWAVE COOKING ASSEMBLY OF A MIXING BOWL, LOCKABLE TOP ASSEMBLY, SUPPORTING A STIRRER POWER ASSEMBLY

[76] Inventors: Janeice A. Jump, P.O. Box 1281, Ellensburg, Wash. 98926; Thomas E. Hale, 9095 SW. Taylor, Portland, Oreg. 97225

[21] Appl. No.: 296,515

[22] Filed: Jan. 12, 1989

[51] Int. Cl.⁵ ............................................. H05B 6/78
[52] U.S. Cl. ..................... 219/10.55 E; 219/10.55 F; 99/348; 99/DIG. 14; 366/244
[58] Field of Search ................... 219/10.55 E, 10.55 F, 219/10.55 R; 99/348, DIG. 14, 451; 366/241-254

[56] References Cited

U.S. PATENT DOCUMENTS

| | | |
|---|---|---|
| 723,977 | 3/1903 | Barney . |
| 2,805,843 | 9/1957 | Block . |
| 3,357,685 | 12/1967 | Stephens . |
| 3,635,147 | 1/1972 | Lee .......................................... 99/348 |
| 3,691,938 | 9/1972 | Nichols .................................. 99/348 |
| 3,697,053 | 10/1972 | Will ................................... 99/348 X |
| 3,783,770 | 1/1974 | Aries ...................................... 99/348 |
| 4,151,792 | 5/1979 | Nearhood ............................. 99/348 |
| 4,254,319 | 3/1981 | Beh et al. ...................... 219/10.55 F |
| 4,330,696 | 5/1982 | Pomeroy et al. .............. 219/10.55 F |
| 4,339,992 | 7/1982 | Kurland ................................ 99/348 |
| 4,576,089 | 3/1986 | Chauvin ................................ 99/348 |
| 4,773,317 | 9/1988 | Wickboldt, Jr. .......... 219/10.55 E X |

FOREIGN PATENT DOCUMENTS

2159027  11/1985  United Kingdom ......... 219/10.55 F

Primary Examiner—Philip H. Leung

[57] ABSTRACT

During microwave oven heating periods of sauces, gravies, custards, soups, eggs, chili and other foods warmed up, heated, or cooked, their required stirring is automatically undertaken by utilizing a microwave cooking assembly of a mixing bowl, a top assembly serving as a cover thereof, and a self contained stirrer power assembly thereof, supported by the top assembly. During the stirring of the food, a paddle of the stirrer power assembly, in moving through the food to stir or to mix the food, also substantially wipes and almost fully scrapes the food from the inner surfaces of the mixing bowl, thereby eliminating any possibility of the creation of any hot spot portions in the food being heated by the microwave energy. Preferably, the top assembly serving as the cover is locked on the mixing bowl during the heating and stirring of the food, by utilizing interfitting and locking handles of both the bowl and top assembly. Preferably, the self contained powered stirrer is essentially supported by the top assembly. The stirring power, in respective embodiments, is supplied by a spring motor, or by an electric motor, AC or DC. Most of the components are made of plastic which is heat resistant up into the range of 300 to 375 degrees Fahrenheit. Metal components are made of stainless steel and they are shielded by the plastic.

24 Claims, 5 Drawing Sheets

MICROWAVE COOKING ASSEMBLY OF A MIXING BOWL, LOCKABLE TOP ASSEMBLY, SUPPORTING A STIRRER POWER ASSEMBLY

BACKGROUND

In respect to culinary operations, cooks have for many years used mechanisms which automatically stir foods during the preparation thereof, whereby the cooks may then undertake other food preparation tasks, without periodically returning to a specific cooking locale to stir the food being heated. In 1903 Alice P. Barney in her U.S. Pat. No. 723,977 illustrated and described her fluid agitator, which was radially adjustable to be positioned about the top rim of many different kettles or boilers. Also she provided a centered shaft which was adjusted up or down to accommodate kettles or boilers of different depths. Moreover, she provided multiple radial blades which were adjustably positioned to different locations about the centered shaft She powered the centered shaft and the radial blades by using a selected source of power, such as a spring with clock like mechanisms, or an electric motor.

In 1957, Robert S. Block, in his U.S. Pat. No. 2,805,843, illustrated and described his stirring appliances, which were clamped on the top rims of bowls or pans and, via a spring mechanism, a stirring blade, adjustable radially to fit different bowls and pans, was rotated just above the bottom of the bowls or pans, during the stirring of a food being prepared.

In 1967, Anait Stephens, in U.S. Pat. No. 3,357,685, illustrated and described a battery operated stirring unit for sauce pans and the like of different sizes. Yokes of the stirring unit were moved radially in or out to bear against the top edges of respective differently sized sauce pans. Any relative turning movement between the stirring unit and the sauce pan, was prevented by placing one of the yokes against a handle of the sauce pan. A cross bar of the stirring unit supported spaced blades in contact with the inner surface of the bottom of the sauce pan. This cross bar was mounted to a vertical depending shaft of the stirring unit, using a relatively sliding fit and a compression spring arrangement, which kept the blades in contact with the bottom of any selected size of sauce pan having a respective different interior depth.

In January 1972, Wallace Lee, in his U.S. Pat. No. 3,635,147, illustrated his combination cooking-stirring vessel, which he primarily used in cooking chop suey during a three hour cooking time, when the mixing of the vegetables, meat, and other ingredients was undertaken constantly. The food was cooked and stirred in a bowl provided with an electrical heating element, and two sets of stirring blades. One set of blades was located adjacent the bowl wall, and the other set of blades were mounted on a central handle. Both sets of blades were rotated by a motor drive, supplying power at the bowl rim. The bowl was elevated, providing a space to receive a plate underneath. After the cooking, a plug in the bottom of the bowl was removed, and upon the continuation of the stirring action, the cooked food was pushed out and down upon the inserted plate located below the bowl.

In September 1972, James Nichols, in his U.S. Pat. No. 3,691,938, illustrated and described his cooking apparatus used in preparing ground meat containing sauces, to make spaghetti sauce and other foods. He provided a self contained power unit on a top closure, removably secured by fasteners to a vessel. The power unit had a centered depending shaft rotating both spaced horizontal paddles, and a U-shaped paddle, which passed closely by, respectively, the sides and bottom of the vessel during cooking times. In addition, he provided stationary spaced horizontal paddle-like members, which were interspaced between the rotating spaced horizontal paddles. The centered depending rotatable shaft was rotatably supported on a stabilizing pin integrally made with the bottom of the vessel.

In September 1972, Michael J. Will, in his U.S. Pat. No. 3,697,053, illustrated and described his stirring device provided to universally fit cooking containers of different sizes. A central unit, housing an essentially self contained power unit, was positioned within a cooking container by using three spaced radial horizontal telescoping rod assemblies, each having an internal length adjusting compression spring. A shaft, depending from the central unit and rotated by the power unit, rotated a set of radial blades, secured to the shaft in a horizontal plane.

In 1974, Graham J. Aries, in his U.S. Pat. No. 3,783,770, illustrated and described his stirrer devices for culinary purposes. He provided a specific lid for a cooking vessel, and fitted this lid with a powered stirrer device. A depending shaft, powered by the stirrer device and a part thereof, resiliently supported a wiper arm or wiper arms, which extended radially and horizontally to movably engage the inner bottom of the cooking vessel, creating a wiping action, which substantially reduced the risk of burning the food being cooked in the cooking vessel.

In 1982, Elaine J. Kurland, in her U.S. Pat. No. 4,339,992, illustrated and described her stirring apparatus, to be mounted on existing containers, such as cooking utensils, for stirring the contents thereof. She provided a motor centrally secured on a horizontal support brace, which, in turn, was adjustably fitted across an open top portion of a cooking container. Selected size paddles were interchangeably removably connected to the motor, for stirring the food contents of the selected size container.

These previous inventors and others have provided a cook with cooking equipment which he or she may operate to cook and to simultaneously automatically stir foods to increase their uniform cooking and to avoid their burning. However, the operational cooking environment within a microwave oven has eliminated essentially all of these prior types of cooking equipment. Therefore, there remains a need for an assembly of components to be arranged and to be operated especially in microwave ovens.

SUMMARY

A very reliable microwave cooking assembly is provided for excellent and convenient use in a microwave oven, when a food being cooked or warmed up, must be stirred to avoid the creation of any hot spots in the prepared food and to avoid any possible burning of the prepared food. Sauces, gravies, custards, soups, chili, eggs, and other foods are placed in a bowl having handles. Then a top assembly, having handles, is placed over the bowl. The respective handles have cooperating locking cam surfaces, whereby the top assembly is releasably locked to the bowl during the microwave cooking time in the microwave oven.

Each top assembly positions and operationally supports a self powered and self contained stirrer power assembly. This stirrer power assembly has a removable stirrer subassembly, i.e. a paddle, which has blades arranged for mixing the food, and blades arranged for wiping the food away from the inner surfaces of the bowl.

Essentially all of the components of this microwave cooking assembly are made of a heat resistant plastic capable of withstanding 300 to 375 degrees Fahrenheit. Where metals must be used, such as in the springs of a spring motor, when such a power source is selected, the metals selected will reflect most microwave energy, such as occurs when stainless steel is used. Also the metals used will be well shielded by the plastic materials. This microwave cooking assembly of a mixing bowl, a top assembly serving as a cover, and self contained stirrer power assembly, having a mixing capability and a substantial scraper or wiping capability, as so manufactured, arranged, and used, provides cooks with a microwave cooking assembly they will efficiently use in their microwave ovens to increase their cooking proficiency and their enjoyment of cooking.

DRAWINGS

A preferred embodiment of the microwave cooking assembly is illustrated in FIGS. 1 through 14 of the drawings. It has a spring motor stirring power source. In FIG. 15 another embodiment having, an electrical motor stirring power source and related components is shown. In the drawings:

DESCRIPTION OF PREFERRED EMBODIMENTS

Figure 14:
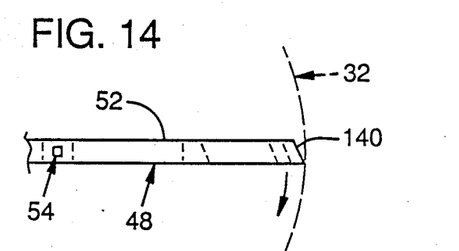
FIG. 14 is a top view of one half of the stirring and wiping paddle, with some mixing bowl portions shown in phantom lines, to illustrate how the paddle is shaped to efficiently and effectively wipe the interior of the mixing bowl, thereby assuring that cold spots are mixed and no hot spots or overly hot portions of the food being stirred will occur.
Figure 15:
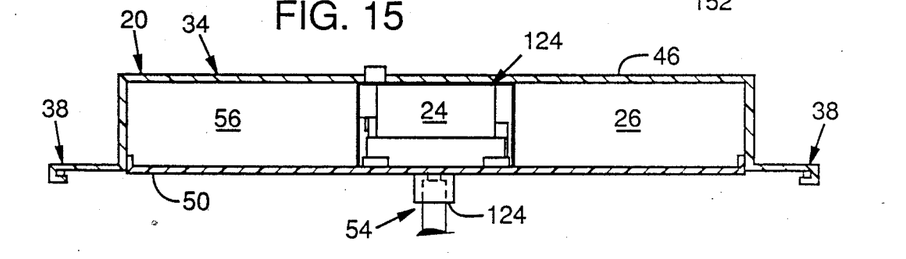
FIG. 15 is a partial sectional view to illustrate how an electric motor serves as the power source for the stirrer power assembly.

The preferred embodiments of the microwave cooking assembly 20 are illustrated in the drawings, with FIGS. 1 through 14 showing a preferred embodiment utilizing a spring motor 22 as the self contained energy source, and with FIG. 15 showing another preferred embodiment, utilizing a direct current electric motor 24 with the battery 26. An alternating current electric motor, not shown, is used with electrical power furnished by a public utility, via an outlet, in another embodiment.

Figure 1:
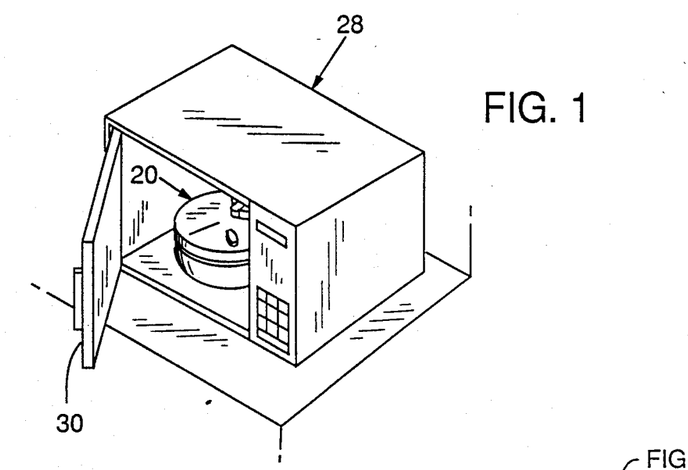
FIG. 1 is a perspective view of a microwave oven, with the door thereof opened, to show this microwave cooking assembly positioned in the microwave oven.

As shown in FIG. 1, this microwave cooking assembly 20, in all embodiments thereof, is made for placement within a microwave oven 28, being readily inserted and removed via the door 30. Essentially all of the components of this microwave cooking assembly 20 are made of a heat resistant plastic capable of withstanding 300 to 375 degrees Fahrenheit. The metals used reflect most microwave energy and they are shielded.

Figure 2:
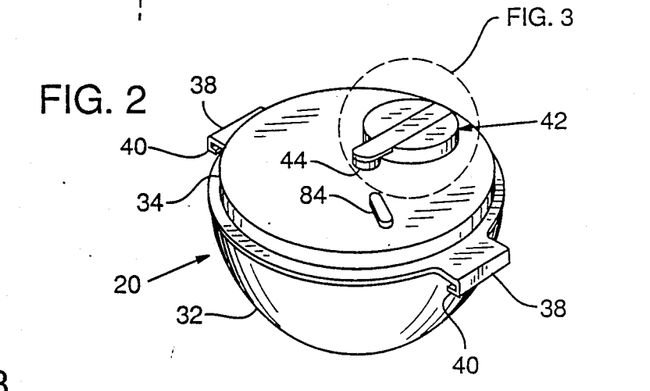
FIG. 2 is a perspective view of this microwave cooking assembly, having food therein, with the cover locked in place, and the energized power source being kept inactive by the utilization of a rachet lock.

In the embodiments shown in FIGS. 1 and 14, the microwave cooking assembly 20 is self contained. As shown in FIG. 2, this assembly 20 is ready to be placed into the microwave oven 28. The food to be stirred, while being warmed, heated, or cooked, has been placed inside the mixing bowl 32, and the top assembly 34 has been locked in place on the top 36 of the bowl 32 This locking is undertaken by using the respective paired handles 38 of the mixing bowl 32 and the top assembly 34, which are respectively provided with respective complementary formed cammed locking surfaces 40. The spring motor 22 has been wound, and a locking rachet 42, appearing in part on the top assembly 34, is in the locked position to keep the spring motor 22 from operating, until the microwave cooking assembly 20 is about to be placed in, or is placed in the microwave oven 28.

Figure 3:
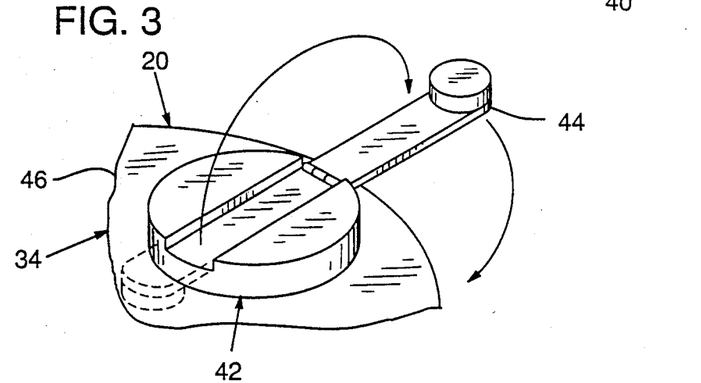
FIG. 3 is a perspective partial view of this microwave cooking assembly, having food therein, with the cover locked in place, and the crank being operated to energize the spring motor power source.

The winding of the spring motor 22 is undertaken by unfolding the foldable crank arm assembly 42, which is mounted in the top assembly 34, to create an extended horizontally operated crank arm 44, as illustrated in FIG. 3. This cranking operation is undertaken after the food has been placed in the mixing bowl 32 and the top assembly 34, has been locked in place about the top 36 of the mixing bowl 32.

Figure 4:
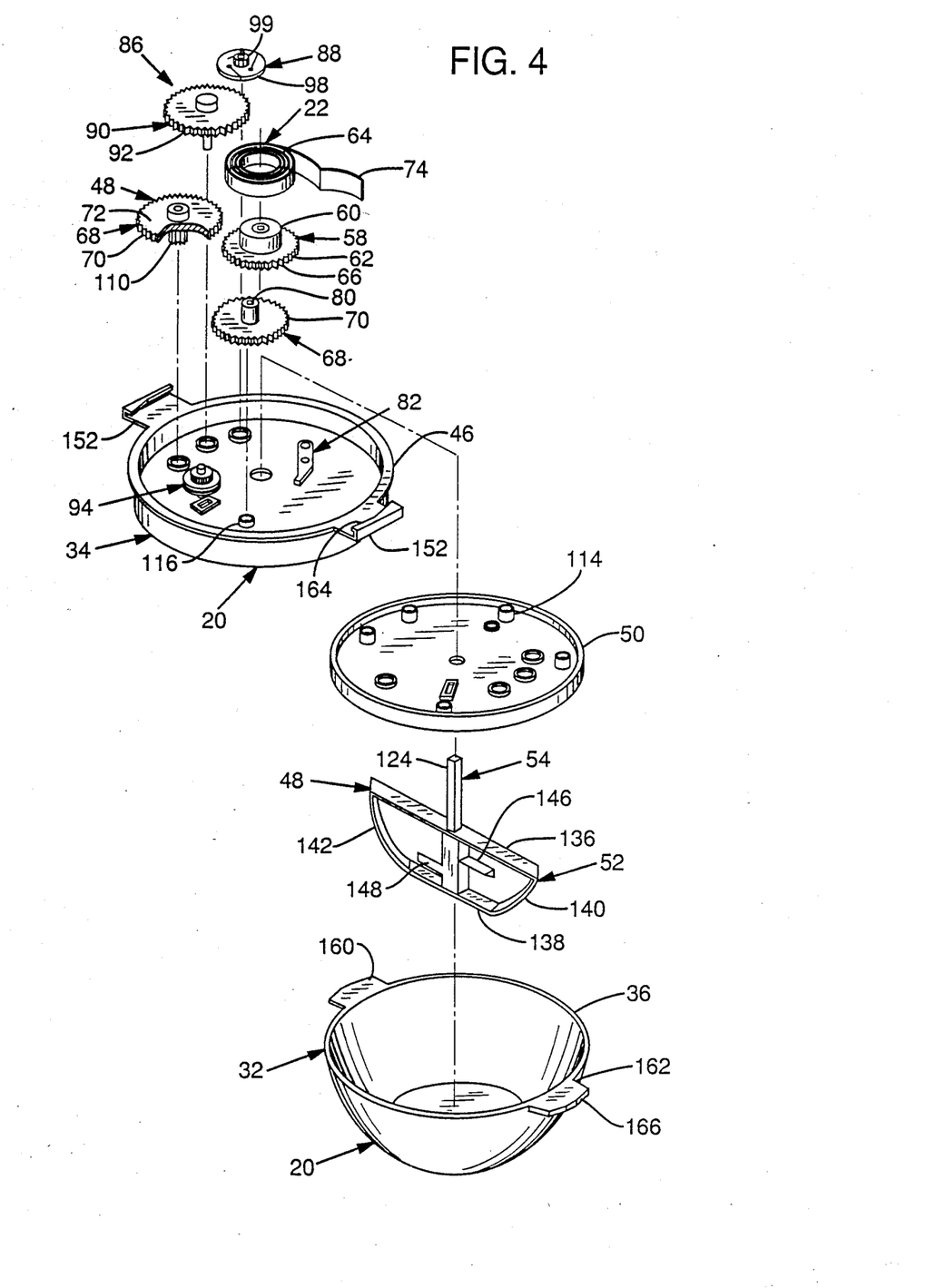
FIG. 4 is a perspective exploded view of the components of the microwave cooking assembly, showing the top assembly serving as the cover, stirrer power assembly with the paddle, and the mixing bowl, the top assembly being shown in inverted relation.

Before the assembly of all of the components of this microwave cooking assembly 30, they could appear, as illustrated in the exploded view of FIG. 4. The top assembly 34 has the two major components, top portion 46, into which are fitted most of the components of the stirrer power assembly 48, and the bottom portion 50, which is secured to the top portion 46 to hold all the components of the top assembly 34, inclusive of most of the stirrer power assembly 48, in their operational places.

The paddle 52 of the stirrer power assembly 48 having its preferred integral shaft 54 is shown aligned with the center line of the top assembly 34. The mixing bowl 32 is also shown aligned with this center line.

Figure 5:
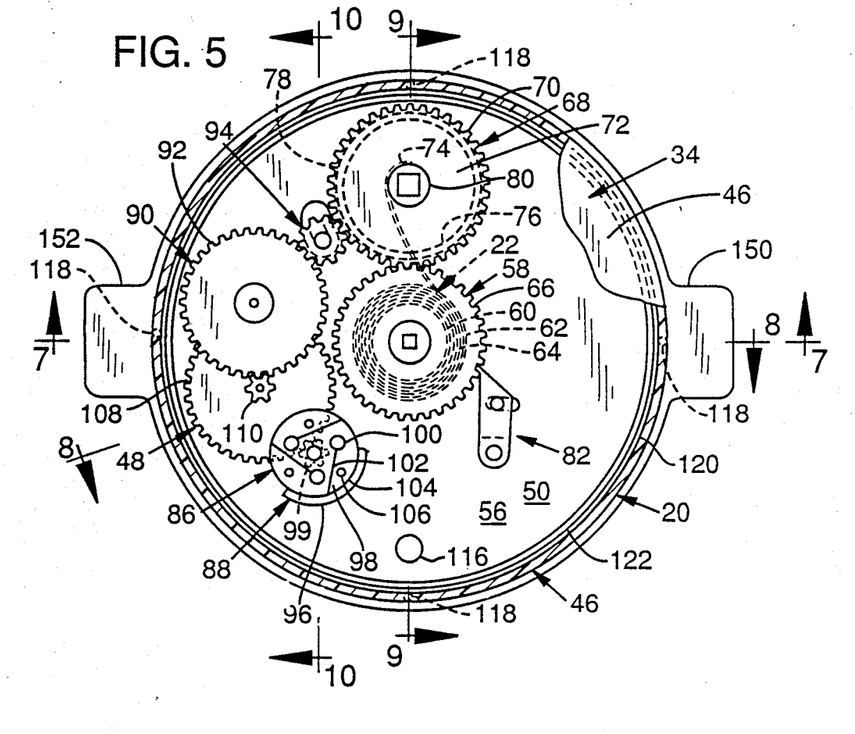
FIG. 5 is a top view of the top assembly serving as the cover of the microwave cooking assembly, showing components of the stirrer power assembly, inclusive of the gears and the speed control with a braking component, a portion of this top assembly being broken away to show internal structure.

In FIG. 5, the inside volume 56 of the top portion 46 of the top assembly 34 is illustrated, where many of the components of the self contained powered stirrer 48, also referred to as the stirrer power assembly 48, are in their operational locations. In the central area of this inside volume 56, a drive gear 58 is rotatably mounted, inclusive of a slip ring 60 thereof. In the center of this drive gear 58 and around the slip ring 60, there is a motor drum volume 62 to receive spring coils 64 of the spring motor 22, as they return, while rotatably powering this drive gear 58, and the paddle 52 via the integral shaft 54. The teeth 66 of the drive gear 58 are continuously formed about the entire circumference thereof.

Radially adjacent to the drive gear 58, is the power gear 68, having teeth 70 continuously formed about the entire circumference thereof, and positioned with some teeth 70 always in mesh with some teeth 66 of the drive gear 58, as shown in FIG. 5. This power gear 68 has a motor drum central volume 72 to receive spring coils 64 of the spring motor 22. The leading end 74 of the first coil 64 passes through an opening 76 of a circular spring retaining wall 78 of the power gear 68, and then passes tightly around a centered spindle 80 of the power gear 68. When the foldable crank arm assembly 42, which is secured to the power gear 68 is utilized, coils 64 of the spring motor 22 are wound about centered spindle 80. When the desired amount of power windings, i.e. coils 64, are completed, the locking rachet 82 is moved into place, via a finger manipulated projection 84 thereof, which protrudes just above the top assembly 34. Upon the subsequent release or clearing movement of the locking rachet 82, the spring motor is activated and the spring coils 64 return to the drive gear 58, turning the drive gear 58 and the paddle 52 of the stirrer power assembly 48.

To offset the inherent tendency of the spring coils 64 to return too fast during the operation of the spring motor 22, a speed control assembly 86, is also mounted within the inside volume 56 of this top portion 46, as shown in FIG. 5. This speed control assembly 86 also includes a braking assembly 88. A double idler gear 90 of this spaced control assembly, which is sized to match both the power gear 68 and the drive gear, has teeth 92, all around the circumference thereof, some of which will always be in mesh with the teeth 66 of the drive gear, as shown in FIG. 5.

A small diameter idler gear 94 which is mounted for rotation in this top assembly 34, is also mounted so the center of rotation is relocatable along a radius of the top assembly 34. When the spring coils 64 are being wound on the power gear 68, the small diameter idler gear 94 tends to move clear of the double idler gear 90. During this time the speed control assembly 86 is therefore disengaged. Then later when the locking rachet 82 is released, and the spring coils 64 commence to return and are returning to the drive gear 58, the small diameter idler 94 moves into contact with both the power gear and the double idler gear 90, and the speed control assembly 86 is engaged.

The effectiveness of the speed control assembly 86 is initially selectable by selecting and assembling the various components of the braking assembly 88. A braking drum 96 is integrally formed in the inside volume 56 of the top portion 46 of the top assembly 34. Within this braking drum 96 a rotatable speed control wheel 98 is placed, having a depending speed control small gear 99 secured to the center thereof. This speed control wheel 98 is made of rubber or of thermal plastic rubber, which is cut to create three holes 100 and is cut along respective lines 102, extending to the circumference from these holes 100 located nearby the central area, at three spaced locations, as shown in FIG. 5. These circular cuts of holes 100, and the cuts along lines 102 create segmental braking portions 104. When centrifugal forces are created, these braking portions 104 move into rotatable contact with the integrally formed braking drum 96, to create the braking load frictional forces. To selectably enhance the effect of the centrifugal forces, a selected metal weight 106 is installed in each segmental braking portion 104.

This preselected braking force of the braking assembly 88, via the depending speed control small gear 99 is transmitted, via a single large idler gear 108, to a depending small gear 110 secured to the center of the double idler gear 90. The teeth 92 of this double idler gear 90 are engaged with the teeth of the drive gear 58, whereby the braking force is transmitted on to the drive gear 58. This braking force prolongs the rewinding time of the return of the spring coils 64 to the drive gear 58, thereby prolonging the stirring time during the operation of the microwave cooking assembly 20, when warming, heating, or cooking time periods are set for the operation of the microwave oven 28.

Figure 6:
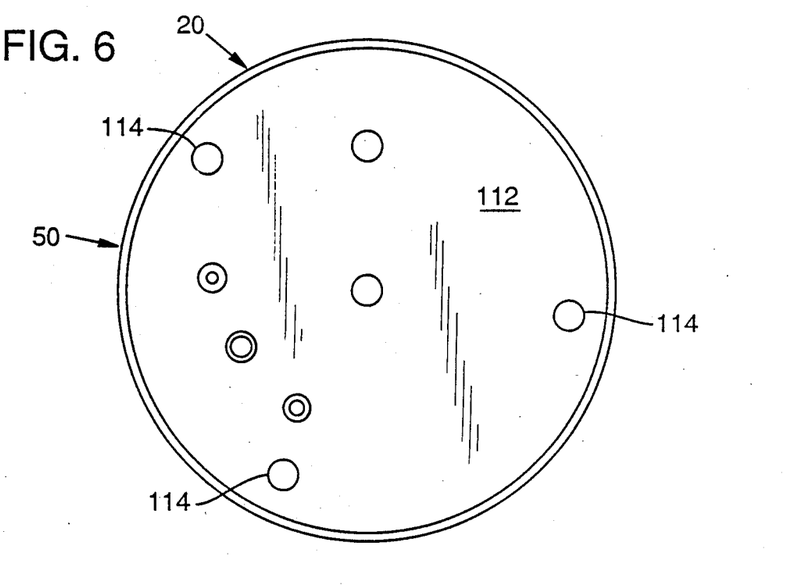
FIG. 6 is a view looking down into the interior of the bottom portion of the top assembly serving as the cover of the microwave cooking assembly, showing how the interior is formed to position components of the stirrer power assembly.
Figure 7:
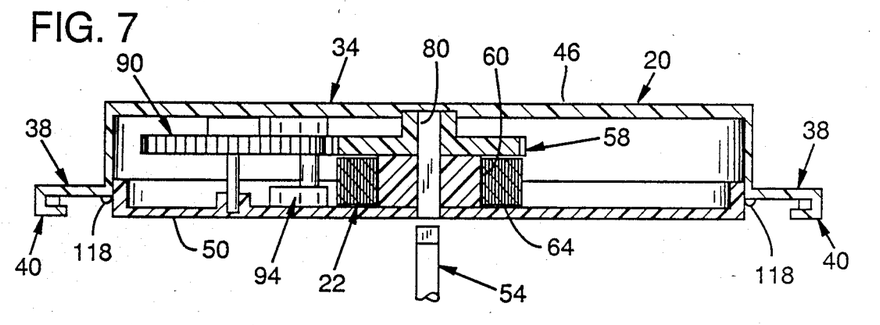
FIG. 7 is a cross-sectional view of the top assembly, serving as the cover, and the stirrer power assembly, taken in the geometric plane indicated by the directional arrows 7—7 in FIG. 5.
Figure 8:
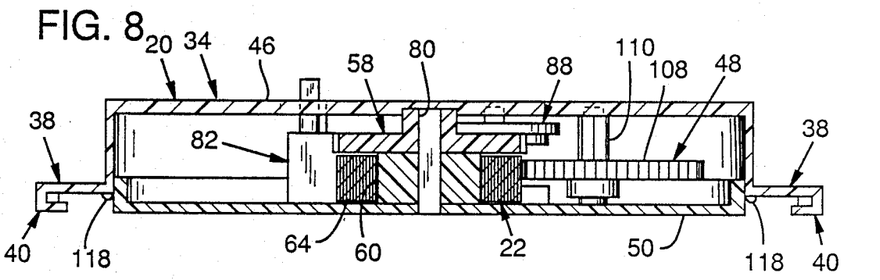
FIG. 8 is a cross-sectional view of the top assembly serving as the cover and the stirrer power assembly, taken in the geometric plane indicated by the directional arrows 8—8 in FIG. 5.
Figure 9:
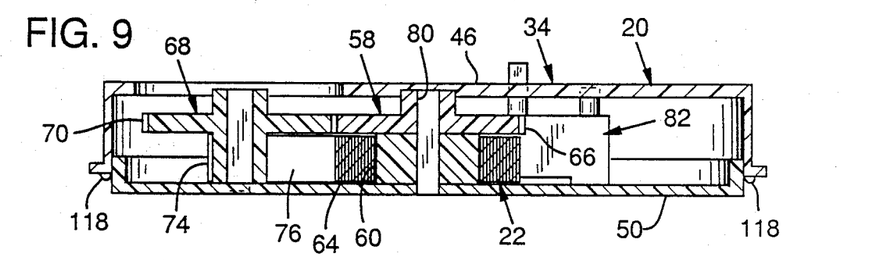
FIG. 9 is a cross-sectional view of the top assembly, serving as the cover and the stirrer power assembly taken in the geometric plane indicated by directional arrows 9—9 in FIG. 5.
Figure 10:
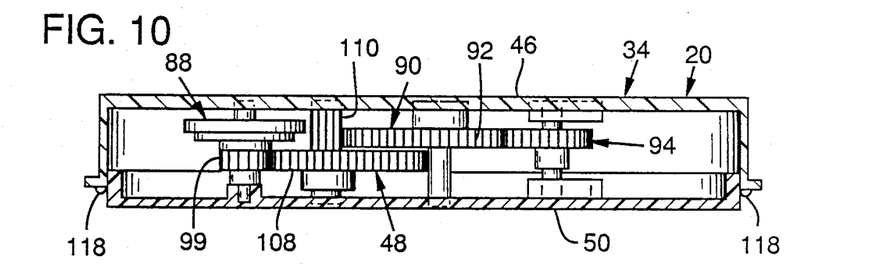
FIG. 10 is a cross-sectional view of the top assembly serving as the cover, and the stirrer power assembly taken in the geometric plane indicated by directional arrows 10—10 in FIG. 5.

This assembly of many of the components of the microwave cooking assembly 20, in the inside volume 56 of the top portion 46, as illustrated in FIG. 5, is maintained in position upon the correct placement and securement of the bottom portion 50 of the top assembly 34. As shown in FIG. 6, the inside volume 112 of the bottom portion 50 of the top assembly 34, has spaced raised portions 114 which complement like spaced raised portions 116 in the inside volume 56 of the top portion 46. At these spaced locations fasteners, not shown, are used to hold the bottom portion 50 to the top portion 46 of the top assembly 34, when these respective raised portions 114, 116 are positioned in line with one another. As also shown in FIG. 6, there are other specially formed portions. Each of these serve to respectively receive one end of the various shafts of the respective gears 58, 68, 90, 94, 108, 110, the speed control wheel 98, and the locking rachet 82.

In FIGS. 7, 8, 9, and 10, sectional views are respectively shown along the vertical planes positioned, as indicated by lines 7—7, 8—8, 9—9, and 10—10, in FIG. 5. Upon observing these FIGS. 7, 8, 9, and 10, the positioning is understood of the various gears and the other components of speed control assembly 86, when they are assembled and held in place between top portion 46 and bottom portion 50 of the top assembly 34, which is subsequently locked in place at the top 36 of the mixing bowl 32. There are depending spaced uniform depth projections 118 integrally formed about the bottom 120 of the top portion 46 of the top assembly 34, which contact the top 36 of the bowl 32 to create venting spaces 122 between them, when the top assembly 34 is locked to the mixing bowl 32.

Figure 11:
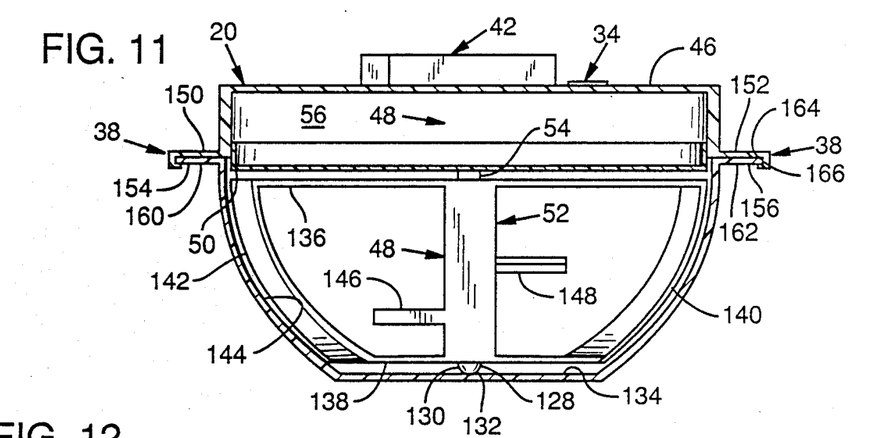
FIG. 11 is a cross-sectional view of only the mixing bowl and the stirring and wiping paddle, and other components, such as the stirrer power assembly and the top assembly serving as the cover are not shown.

The relative size and positioning of the paddle 52, i.e. a stirrer subassembly 52, of the stirrer power assembly 48 within the interior of the mixing bowl 32 is illustrated in FIG. 11, where an elevational view of the paddle 52 is shown in conjunction with sectional portions of the mixing bowl 32. The paddle 52 has either a separate shaft or preferably an integral upstanding vertical shaft 54, which has a top portion 124 of square cross-section extending above for engagement with the spring motor 22 of this embodiment, or the electric motor 126 of another embodiment. The lower portion 128 of shaft 54 terminates in a somewhat half sphere projection 130, which rotatably fits into a complementary shaped receiving locating hole 132 formed in the bottom interior 134 of the mixing bowl 32. This lower portion 128 of the shaft 54 integrally supports an upper horizontal cross arm 136. In respect to the entire length of shaft 54, this upper horizontal cross arm 136 is mounted centrally on this vertical centered integral shaft 54.

Also this lower portion 128 of the shaft 54 at the bottom thereof just above the half sphere projection 130, integrally supports a lower horizontal cross arm 138. Then integrally made with these respective horizontal cross arms 136, 138, are wipers 140, 142, which extend between the respective ends of horizontal cross arms 136, 138. The wipers 140, 142 may be referred to as scrapers 140, 142. However, whether considered as wipers or scrapers, they do not directly contact the inner side surfaces 144 of the mixing bowl 32. For example, in one embodiment, the clearance is 0.0785 of an inch between the wipers 140, 142 and the mixing bowl 32.

In addition this lower portion 128 of the shaft 54 has two integral mixing blades 146, 148 radially projecting outwardly and vertically spaced apart from one another along the shaft 54. The upper integral radial mixing blade 146 is spaced down from the upper horizontal cross arm 136, and the lower integral radial mixing blade 148 is spaced above the lower horizontal cross arm 138. These mixing blades 146, 148 project in opposite radial directions, as shown in FIG. 11.

Preferably all these integral portions of the paddle 48 are integrally molded into a single geometric plane, as indicated in FIG. 11, and as shown in FIG. 14, where a top view of the paddle 48 is illustrated with portions of the mixing bowl 32 shown in phantom lines. Rotational arrows in FIG. 14 indicate the rotational direction of the paddle 52. The wipers 140, 142 are formed on their respective angles, as illustrated, to effectively carry out their respective wiping functions, thereby moving food portions away from the interior or inner side surfaces 144 of the mixing bowl 32, upon the rotation of the paddle 52 by the stirrer power assembly 48. Also when the lower horizontal cross arm 138 rotates closely over the bottom interior surface 134 of the mixing bowl 32, food portions are moved away from this inner bottom surface 134. By continuing such movements of the foods being warmed, heated, or cooked, the tendency of any possible forming of hot spots in the food is very substantially reduced, during the operating time of the stirrer power assembly 48 and the rotation of the paddle 48 thereof.

Figure 12:
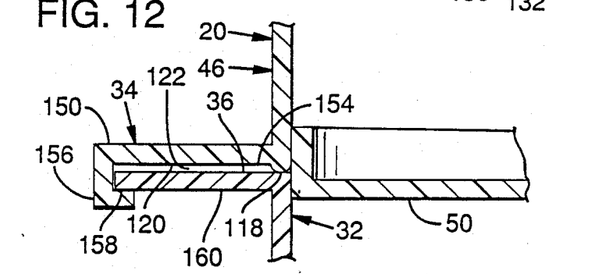
FIGS. 12 and 13 are partial enlarged views showing how the respective handles of the mixing bowl and the top assembly serving as the cover are formed with locking cam surfaces, whereby the top assembly is locked to the mixing bowl, via rotating operations of their respective handles.
Figure 13:
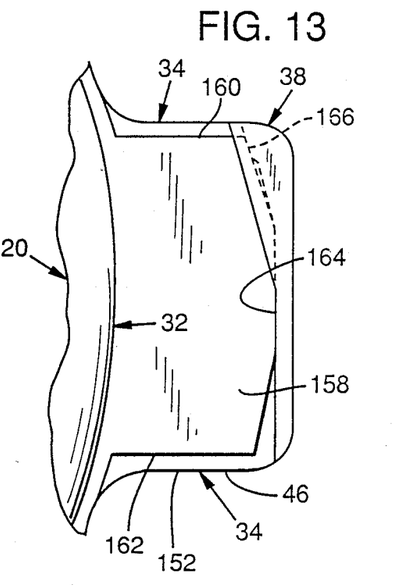

The locking of the top assembly 34, or the lid assembly 34, serving as the cover, relative to the mixing bowl 32 must be undertaken. The food mixing or stirring forces created upon operation of the stirrer power assembly 48 are reacted to by this locking of the top assembly 34 to the mixing bowl 32. Preferably, this locking is undertaken by relatively moving the paired handles 38 in opposite rotational directions. As shown in FIGS. 12 and 13, the opposite handles 150, 152 on the top portion 46 of the top assembly 34 have: on their undersides 154, a depth projection 118 utilized in maintaining a venting space 122; also a depending rim portion 156 to receive an edge portion 158 of a respective opposite handle 160 or 162 of the mixing bowl 32; and in addition cam surfaces 164, which interact with the cam surfaces 166 on the respective opposite handles 160, 162 of the mixing bowl 32, thereby serving as the overall complementary cammed locking surfaces 40.

The person using this microwave cooking assembly 20, when he or she is ready to lock the top assembly 34 on the top 36 of the mixing bowl 32, rotates paired handles 38, i.e. a handle 150 and handle 160, or a handle 152 and a handle 160, or a handle 152 and a handle 162, or other combinations thereof, together until they overlap and stop at their fully interlocked positions. They so remain in these respective interlocking, overlapping positions until the warming, heating, or cooking time is completed and the microwave cooking assembly 20 is removed from the microwave oven 28. Then to unlock the top assembly 34 from the mixing bowl 32, the person will use his or her fingers to squeeze together the respective paired handles 38, thereby aligning them as observed from above. In such aligned positions of their paired handles 38, the top assembly 34 will be in an unlocked position relative to the mixing bowl 32.

In these FIGS. 1 through 14, a preferred embodiment of the microwave cooking assembly 20 has been illustrated which has a stirrer power assembly 48, having a spring motor 22. The various gears, the speed control assembly 86, and the baking assembly 88 thereof, are used to make the spring motor 22 effective. These components are not necessary when an electric motor 24 is used as the turning power source of a stirrer power assembly 170, as shown in FIG. 15. The electric motor 24 is a direct current motor 24, as shown, having a battery 26 as the source of the electrical energy. An alternating current electric motor, not shown, is used when the microwave oven is equipped with an inside alternating current outlet, not shown.

In respect to a particular microwave cooking assembly 20, which was made: the mixing bowl 32 was injection molded using a polycarbonate plastic; the top portion 46 and the bottom portion 50 of the top assembly 34 were injection molded using a polystyrene plastic; the paddle was injection molded using a polycarbonate plastic; and the gears were injection molded using a plastic identified by the trademark Debrin. All the plastic materials selected must withstand temperatures up to and within the range of 300 to 350 degrees Fahrenheit.

The spring motor selected was identified by the trademark Neg'ator. The metals used in the spring motor 22 were stainless steel, because stainless steel reflects most microwave energy. The surrounding injection molded plastic components effectively shielded the stainless steel components.

The mixing bowl 32 had an eight inch inside diameter at the top 36. The inner side surfaces 144 of the bowl 32 were formed on a four inch radius. The depth of the bowl 32 was 3.593 inches and the diameter of the inside bottom of the mixing bowl 32 was 4.531 inches. The paddle 52 had a 7.908 inch diameter at the top thereof. The wipers 140, 142 of the paddle 52 were formed on a 3.953 inch radius. The depth of the paddle 52 was three inches.

Microwave cooking assemblies 20 as illustrated and/or described, provide a person who is preparing foods for meals, to make greater use of microwave ovens 28. He or she will now be able to use this microwave cooking assembly 20 with the stirrer power assembly 48 thereof, to prepare foods in a microwave oven 28, when they require essentially constant stirring during their warming, heating, or cooking times.

We claim:

1. A microwave cooking assembly comprising:
   (a) a mixing bowl
   (b) a cover on said mixing bowl; and
   (c) a self-contained stirrer power assembly in said cover,
   (d) a stirring blade assembly depending from said stirrer power assembly and projecting into said bowl for wiping and mixing functions in said bowl,
   (e) said mixing bowl, cover, stirrer power assembly and said stirring blade assembly "being independent of and freely movable into and out of a microwave oven and " comprising heat resistant plastic materials capable of operating up into the range of 300 to 375 degrees Fahrenheit and being compatible with microwave use,
   whereby foods in said bowl are capable of being cooked in a microwave oven and simultaneously stirred.

2. A microwave cooking assembly, as claimed in claim 1, wherein the self contained stirrer power assembly has as a power source a direct current electric motor having a battery source of electrical energy.

3. A microwave cooking assembly, as claimed in claim 1, wherein the self contained stirrer power assembly has as a power source an alternating current electric motor adapted to be connected to an outlet source of electrical energy from a public utility.

4. A microwave cooking assembly, as claimed in claim 1, wherein the self contained stirrer power assembly has a control subassembly to control the resulting speed of the stirrer.

5. A microwave cooking assembly, as claimed in claim 1, wherein the self contained stirrer power assembly "including said stirrer blade assembly for receiving power and rotating" substantially within the food being cooked, comprising:
   (a) a vertical centered shaft;.
   (b) an upper horizontal cross arm mounted centrally on the vertical centered shaft;
   (c) a lower horizontal cross arm mounted near the bottom of the vertical centered shaft;
   (d) wipers joining the horizontal cross arms at their respective ends; and
   (e) two horizontal paddles radially secured to the vertical centered shaft.

6. A microwave cooking assembly, as claimed in claim 5 wherein the horizontal paddles are radially secured at different heights on the vertical centered shaft.

7. A microwave cooling assembly, as claimed in claim 6 wherein the stirrer blade assembly is arranged in one vertical plane, serving as an overall paddle.

8. A microwave assembly, as claimed in claim 7 wherein the stirrer blade assembly is integrally made as an overall paddle.

9. A microwave cooking assembly, as claimed in claim 8, wherein the vertical centered shaft has a projecting lower end, and the mixing bowl has a centered inside receiving hole to rotatably receive this projecting lower end of the vertical centered shaft.

10. A microwave cooking assembly, as claimed in claim 5, wherein the vertical centered shaft has a top portion to receive the power generated within the self contained stirrer power assembly.

11. A microwave cooking assembly, as claimed in claim 5, wherein the mixing bowl has interior side walls formed on a radius, and wherein the wipers of the stirrer blade assembly are formed on a lesser radius, whereby a limited clearance exists between these interior side walls and these wipers.

12. A microwave cooking assembly, as claimed in claim 5, wherein the wipers are formed on an angle to direct the food away from the interior sides of the mixing bowl to substantially reduce any tendency of the formation of hot spots in the food being warmed, heated, or cooked.

13. A microwave cooking assembly, as claimed in claim 12, wherein the lower horizontal cross arm is efficiently utilized during the rotation thereof to substantially reduce any tendency of the formation of hot spots in the food being warmed, heated, or cooked.

14. A microwave cooking assembly, as claimed in claim 5 wherein the lower horizontal cross arm is efficiently utilized during the rotation thereof to substantially reduce any tendency of the formation of hot spots in the food being warmed, heated, or cooked.

15. A microwave cooking assembly, as claimed in claim 1, wherein:
   (a) the mixing bowl has radially projecting handles, each having locking cam surfaces; and
   (b) the cover has radially projecting handles, each having locking cam surfaces;
   whereby, upon relative circular movements of the cover and the mixing bowl, using the respective radially projecting handles, the respective locking cam surfaces serve alternatively in locking and unlocking the cover on the mixing bowl.

16. A microwave cooking assembly, as claimed in claim 15 wherein the cover has spaced small depending portions to contact the mixing bowl creating circumferentially located vents between these spaced small depending portions.

17. A microwave cooking assembly, as claimed in claim 15, wherein the radially projecting handles of the mixing bowl, and the radially projecting handles on the cover, via their respective camming surfaces, upon tightening, to lock the top assembly to the mixing bowl, override one another, and then later, after the heating or cooking is completed, and the mixing bowl is taken out of the microwave oven, the projecting handles are squeezed together to align them and to there by unlock them and to thereby also unlock the cover, from the top of the mixing bowl.

18. A microwave cooking assembly, as claimed in claim 1, wherein the cover, comprises a top portion and a bottom portion, which when secured together provide a volume into which essentially the stirrer power assembly is mounted, except for the depending stirrer blade assembly as a paddle to mix and to wipe the food being heated or cooked within the mixing bowl.

19. A microwave cooking assembly comprising:
   (a) a mixing bowel;
   (b) a cover on said mixing bowl;
   (c) a self-contained stirrer power assembly in said cover;
   (d) said stirrer power assembly comprising a coilable spring motor,
   (e) a gear drive modifying the power of said coilable spring motor,
   (f) said gear drive comprising a power gear having:
      1. means to receive windings of the coilable spring motor,
      2. means to rotate the power gear to wind on the windings of the coilable spring motor, and
      3. means to rotatably mount the power gear on said cover;
   (g) a drive gear having:
      1. means to receive windings of the coilable spring motor;
      2. means to receive a slip ring;
      3. means to rotatably mount the drive gear on said cover at the center thereof and in engagement with the power gear;
   (h) a slip ring mounted on the means to receive it on the drive gear;
   (i) a ratchet assembly mounted on said cover and positioned to be moved into engagement with the drive gear to prevent the drive gear from rotating,
   (j) a stirring blade assembly depending from said stirrer power assembly and projecting into said bowl for wiping and mixing functions in said bowl,
   (k) said mixing bowl, cover, stirrer power assembly and said stirring blade assembly comprising heat resistant plastic materials capable of operating up into the range of 300 to 375 degrees Fahrenheit and being compatible with microwave use.

20. A microwave cooking assembly, as claimed in claim 19, wherein the gear drive has, in addition, a speed control assembly, in turn comprising:
   (a) a double idler gear having a means to rotatably mount the double idler gear on the cover and in engagement with the driver gear; and
   (b) an idler gear movably mounted on the cover to move into engagement with both the power gear and the double idler gear, during the spring power release of energy as the coilable springs of the spring motor leave the power gear returning to rotate the drive gear and thereby create a stirring action.

21. A microwave cooking assembly, a claimed in claim 20, wherein the double idler gear has a means to receive a spur gear at the center thereof for like rotational speed together; and
   wherein in speed control assembly has, in addition:
      (a) a spur gear secured to the means to receive a spur gear;
      (b) a single idler gear, for engagement with the spur gear secured to the means on the double idler gear, having means to rotatably mount the single idler gear on the cover;
      (c) a braking subassembly mounted on the cover, comprising in turn:
         (i) a braking drum mounted on the cover;
         (ii) a speed control wheel rotatably mounted within the braking drum;
         (iii) centrifugal radially moving brake shoes mounted on the speed control wheel and radially movable into braking contact with the braking drum;
         (iv) a speed control spur gear mounted at the center of the speed control wheel, and engaged with the single idler gear whereby the braking forces are transmitted, via the single idler gear, to the spur gear, and then to the double idler gear, and beyond to the drive gear to controllably moderate the release of the energy of the coiled spring motor during the stirring action.

22. A microwave cooling assembly, as claimed in 21, wherein the centrifugal radially moving brake shoes have selective size inserted weights to pre-calibrate the subsequently created braking power of the braking assembly of the speed control assembly.

23. A microwave cooking assembly, as claimed in claim 22, wherein the centrifugal radially moving brake shoes are made of rubber and thermal plastic rubber.

24. A microwave cooking assembly, as claimed in claim 19, wherein the means to rotate the power gear to wind on the coilable springs of the spring motor comprises:
   (a) disc body extending upwardly from the power gear and secured to the power gear for rotating above the cover, having a recess to receive a pivotally stored handle;
   (b) a pivotally stored handle pivotally secured to the disc body and stored in the recess, until pivoted substantially clear of the disc body forming an extended crank handle.

* * * * *